(12) United States Patent
Hatchett

(10) Patent No.: US 6,773,123 B1
(45) Date of Patent: Aug. 10, 2004

(54) BABY SEAT MIRROR

(76) Inventor: Pamela R. Hatchett, 537 Harper St., Winston-Salem, NC (US) 27104

( * ) Notice: Subject to any disclaimer, the term of this patent is extended or adjusted under 35 U.S.C. 154(b) by 70 days.

(21) Appl. No.: 10/154,101

(22) Filed: May 23, 2002

(51) Int. Cl.$^7$ ................................................ G02B 7/182
(52) U.S. Cl. ........................ 359/872; 359/871; 248/464; 248/472
(58) Field of Search ................................. 357/844, 871, 357/872; 248/464, 472

(56) References Cited

U.S. PATENT DOCUMENTS

| | | | | |
|---|---|---|---|---|
| 4,702,572 A | | 10/1987 | Cossey ........................ 350/639 |
| 4,712,892 A | * | 12/1987 | Masucci ...................... 359/871 |
| 4,902,118 A | | 2/1990 | Harris ......................... 350/631 |
| D332,076 S | | 12/1992 | El-Faham .................. D12/187 |
| 5,949,595 A | | 9/1999 | Kissinger .................... 359/854 |
| 6,039,455 A | | 3/2000 | Sorenson .................... 362/142 |
| 6,120,155 A | * | 9/2000 | Brennan et al. ............ 359/857 |
| 6,179,267 B1 | | 1/2001 | Johnston ................... 248/475.1 |
| 6,264,340 B1 | | 7/2001 | Menefee ..................... 359/881 |
| 6,305,810 B1 | | 10/2001 | Mercado ..................... 359/872 |
| 2002/0036846 A1 | * | 3/2002 | Edgar ......................... 359/841 |

* cited by examiner

Primary Examiner—Drew A. Dunn
Assistant Examiner—Joshua L. Pritchett
(74) Attorney, Agent, or Firm—John D. Gugliotta; Olen L. York, III

(57) ABSTRACT

An apparatus is provided that allows drivers of motor vehicles to see the face of infants or children sitting in rear facing car seats in the rear of the car. A foldable "L"-has approximately the same width as a conventional infant car seat. The bottom portion of the "L" is secured under the car seat by friction and weight. The other portion of the "L" extends up the back of the automobile seat, and is provided with a reflective surface such that a child in a rear facing car seat will look directly into it. The top portion is an adjustable viewing mirror with which the driver will be able to see the child. The angle between the two "L" sections is adjustable to compensate for seat design and viewing angle. The frame around the reflective plastic mirror section can be decorated with an appropriate child pattern.

7 Claims, 5 Drawing Sheets

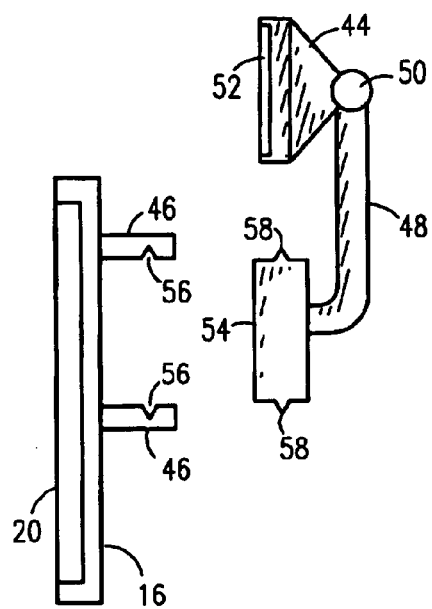
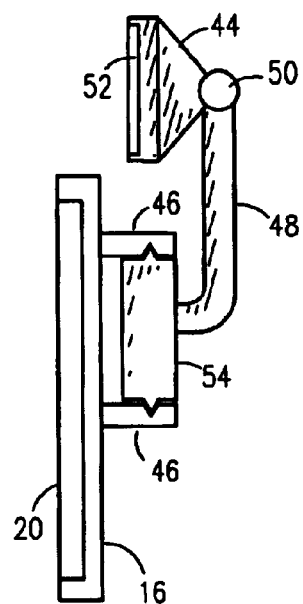
*Fig. 8*  *Fig. 9*
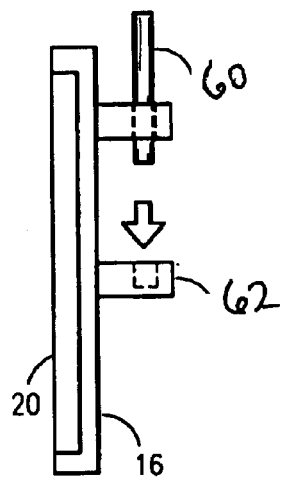
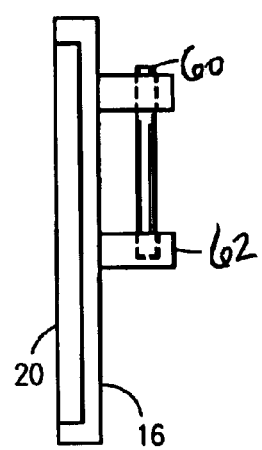
*Fig. 10a*  *Fig. 10b*

BABY SEAT MIRROR

RELATED APPLICATIONS

The present invention was first described in Disclosure Document Registration 501,957 filed on Dec. 7, 2001 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to vehicle rear-seat mirror systems and, more particularly, to a folding mirror with impingement base that slides under an infant car seat for securement.

2. Description of the Related Art

For parents and others involved in raising children, nothing even comes close to the importance placed on ensuring the child's safety at all times, day and night. This notion is perhaps best demonstrated in the safety precautions taken while traveling in an automobile. Mandated not only by conscience but also by law, small children are to be placed in safety seats at all times while traveling in an automobile. Even more protection can be provided to small children and infants who are placed in rear-facing car seats located in the rear seat. One major problem with this arrangement however, is that the driver cannot see the infant. Crying, fussiness and the like must wait until the car is stopped and the driver can attend to the infant. This arrangement is disconcerting for the infant as well as they see nothing or no one other than the back seat for the entire trip.

A search of the prior art did not disclose any patents that read directly on the claims of the instant invention; however, the following references were considered related.

U.S. Pat. No. 6,305,810 issued in the name of Mercado, describes a device for viewing or observing an infant within a rearwardly facing infant car seat.

U.S. Pat. No. 6,264,340 issued in the name of Menefee, describes a device, which enables a driver of a vehicle to monitor an infant in a rear seat by the rear view mirror of the vehicle.

U.S. Pat. No. 6,309,455 issued in the name of Sorenson, describes an infant observation mirror attached to a rear-facing infant car seat.

U.S. Pat. No. 6,179,267 issued in the name of Johnston, describes a mount for a baby mirror for viewing an infant in a rearwardly facing baby seat.

U.S. Pat. No. 5,949,595 issued in the name of Kissinger, describes a child view safety mirror.

U.S. Pat. No. 4,902,118 issued in the name of Harris, describes a mirror assembly for observing an infant in the back seat of a car with a rear-facing car seat.

U.S. Pat. No. 4,702,572 issued in the name of Cossey, describes a system for viewing an infant in the rear seat of a vehicle using a mirror mounted of the back seat of the vehicle.

U.S. Pat. No. D332, 076 issued in the name of El-Faham, describes an ornamental design of a set of mirrors for viewing an infant in the rear of a vehicle.

Consequently, there is a need for a means by which infants and children placed in rear-facing car seats in the rear of a motor vehicle can have and receive visual access to the driver.

SUMMARY OF THE INVENTION

It is therefore an object of the present invention to provide an improved vehicle rear-seat mirror systems.

It is a feature of the present invention to provide an improved folding mirror with impingement base that slides under an infant car seat for securement.

Briefly described according to one embodiment of the present invention, an apparatus is provided that allows drivers of motor vehicles to see the face of infants or children sitting in rear facing car seats in the rear of the car. The invention takes the form of a foldable "L"-shaped frame that is approximately the same width as a conventional infant car seat. The bottom portion of the "L" is secured under the car seat by friction and weight. The other portion of the "L" extends up the back of the automobile seat, and is provided with a reflective surface such that a child in a rear facing car seat will look directly into it. The top portion is an adjustable viewing mirror with which the driver will be able to see the child. The angle between the two "L" sections is adjustable to compensate for seat design and viewing angle. The frame around the reflective plastic mirror section can be decorated with an appropriate child pattern. The mirror in addition to providing reassurance to the driver that the child is okay, also provides reassurance to the child that the driver is still there, and provides amusement to the child by allowing the child to see themselves.

The use of the present invention provides a quick and easy means to reassure both driver and child that all is okay when using rear facing infant seats in motor vehicles.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 8 is a cross-sectional view of the apparatus shown in FIG. 6 and FIG. 7, with the top mirror detached from the base member taken through line 8—8;

FIG. 9 is a cross-sectional view of the apparatus shown in FIG. 6 and FIG. 7, with the top mirror slidably attached to the base member;

FIG. 10-A is a cross-sectional view of the reflective surface support means and the top mirror base support member as shown in FIG. 6 and FIG. 7, taken through line 8—8, with an optional locking device that slides along a lock cavity, with the locking device in an unlocked position; and FIG. 10-B is a cross-sectional view of the apparatus shown in FIG. 10-A with an optional locking device in a locked position taken through line 8—8.

DESCRIPTION OF THE PREFERRED EMBODIMENTS

1. Detailed Description of Figures

Figure 1:
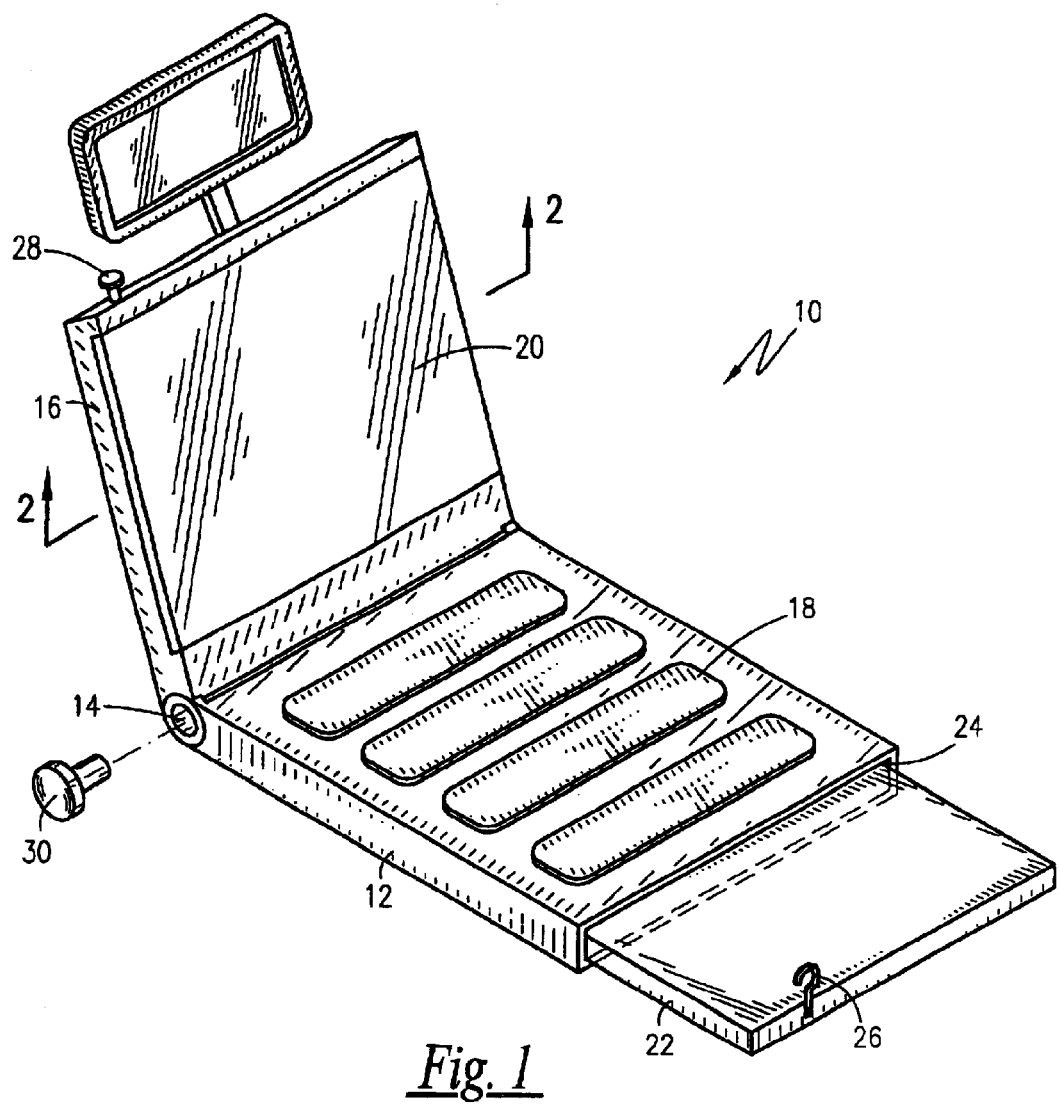
FIG. 1 is a partially exploded perspective view of the baby seat mirror, with optional pivot tightening knob detached and optional extendable impingement base shown in an extended position.
Figure 2:
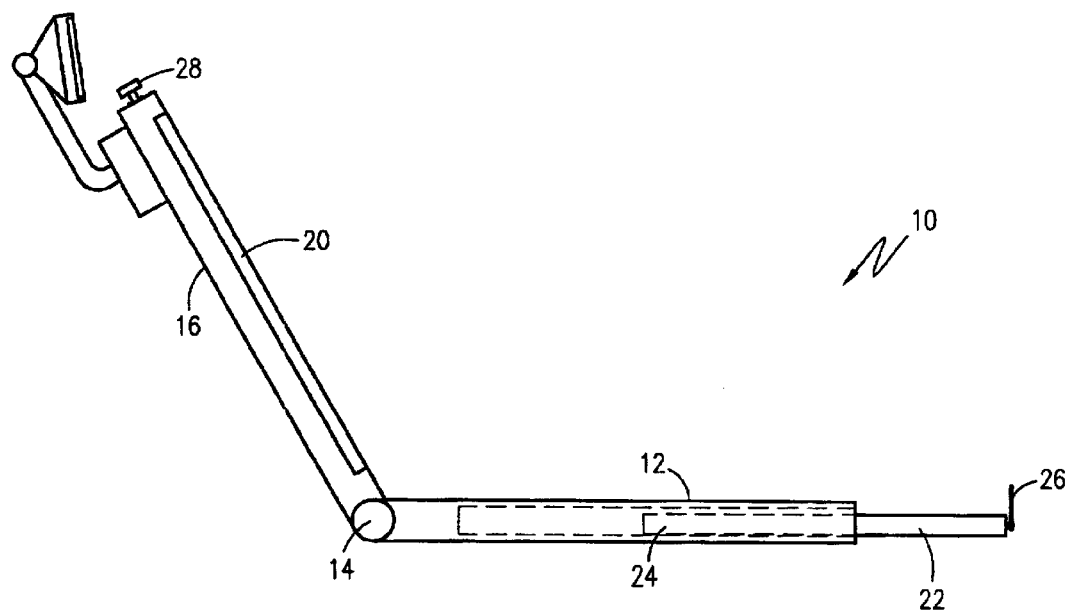
FIG. 2 is an exploded cross-sectional view of the apparatus shown in FIG. 1, taken through the line 2—2, with optional extendable impingement base shown in an extended position.

Referring now to FIG. 1 and FIG. 2, a baby seat mirror 10 is shown, according to the present invention, from an exploded perspective view comprising an impingement base member 12 pivotally attached by a hinging means 14 to a reflective surface support means 16. Preferably, the impingement base member 12 is made of a durable substance, such as plastic, and optionally may contain a plurality of friction-generating strips 18, preferably made of a rubber-like composition, which are adhesively or appropriately attached to said impingement base member 12 to provide extra resistance against the baby seat mirror 10 shifting unnecessarily. A reflective surface 20 is adhesively or appropriately attached to the reflective surface support means 16. FIG. 2 is an exploded cross-sectional view of the baby seat mirror 10 shown in FIG. 1, with the optional extendable impingement base 22 slidably withdrawn from the impingement base cavity 24.

Optionally, the impingement base member 12 may house an extendable impingement base 22 within an impingement base cavity 24. The extendable impingement base 22 may house a closure clip 26 which will securely attach to an optional closure prong 28, which is appropriately affixed to the top of the reflective surface support means 16. A user can fold the baby seat mirror 10 and attach the closure clip 26 to the closure prong 28, thus having a convenient means for carrying or storing the baby seat mirror when not in use. A further option provides a pivotal tightening knob 30 that attaches to the hinging means 14 and turns in a clockwise or counterclockwise rotation to tighten or loosen the rigidity of the reflective support means 16 in relation to the impingement base member 12.

Figure 3:
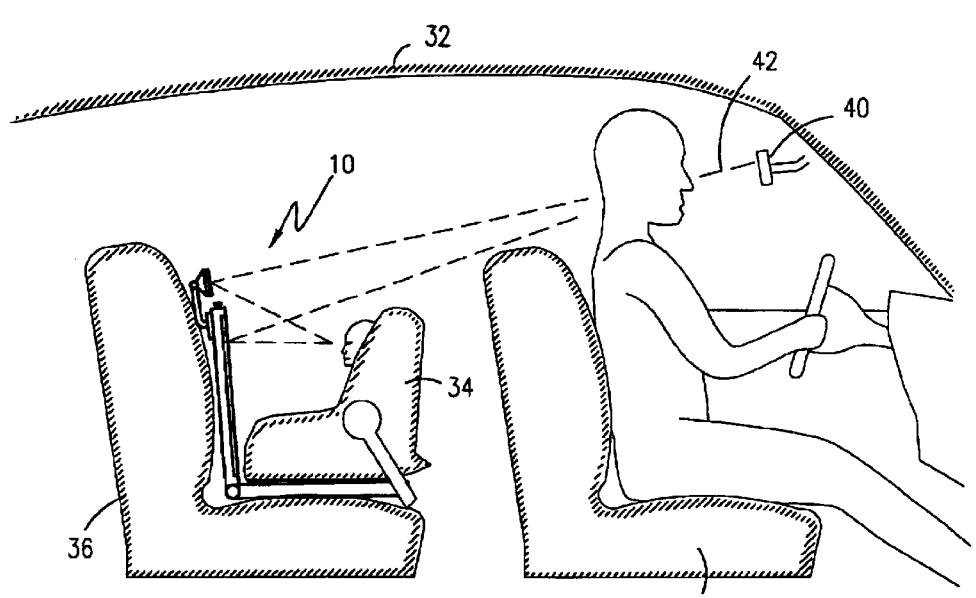
FIG. 3 is a partly cut-away side view of a passenger vehicle in which the apparatus shown in FIG. 1 is placed into position beneath the child safety seat and the line of sight for the vehicle mirror and the baby seat mirror are indicated.

Referring now to FIG. 3, a partially cut-away side view of a passenger vehicle 32 with the baby seat mirror 10 positioned beneath the child safety seat 34 and against the rear passenger seat 36. A driver is positioned in the front driving seat 38 with the rear view vehicle mirror 40 appropriately adjusted to reflect the child's image along a line 42.

Figure 4:
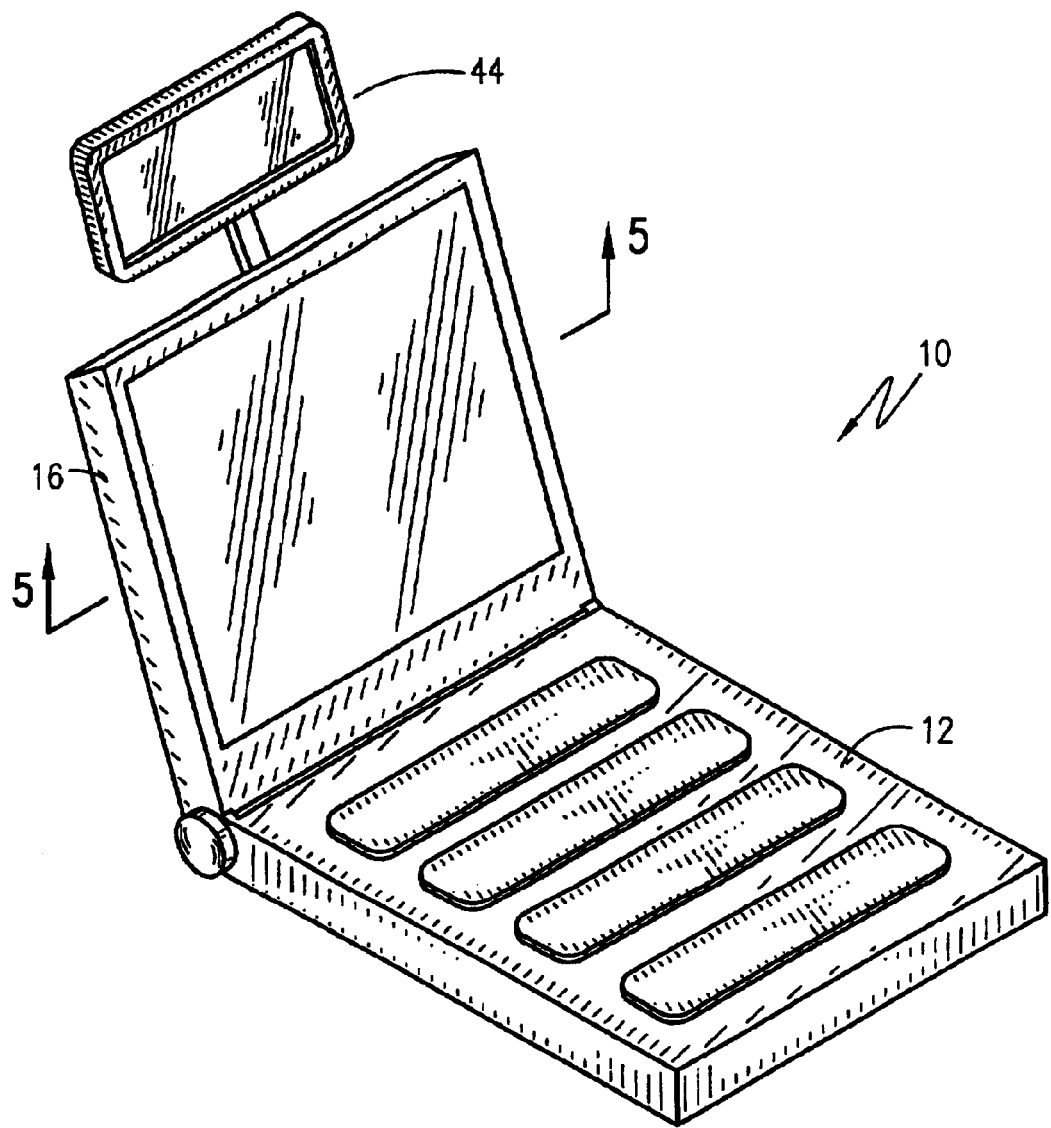
FIG. 4 is a perspective view of the apparatus shown in FIG. 1 with an adjustable top mirror attached to the reflective surface support means.
Figure 5:
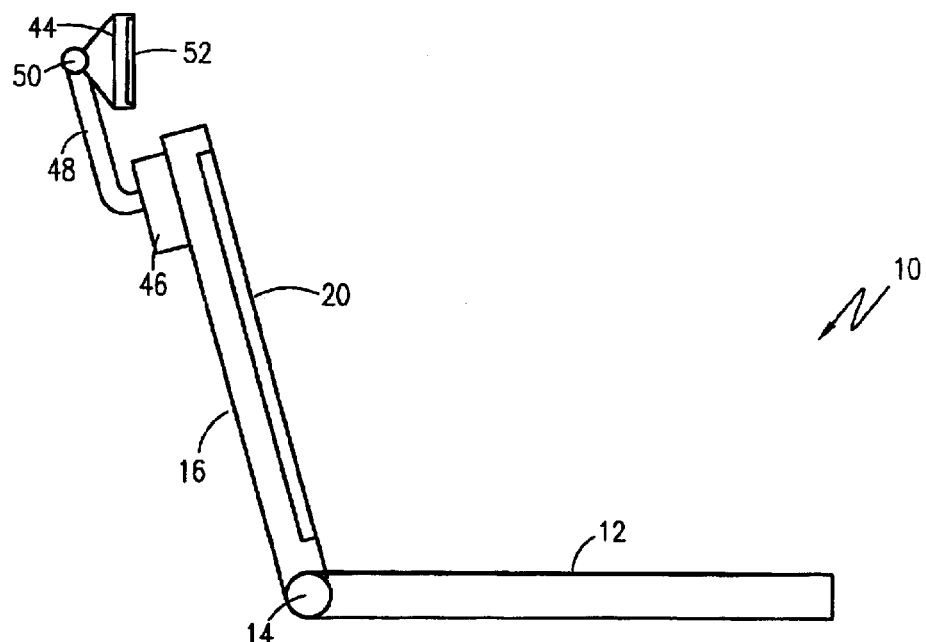
FIG. 5 is a cross-sectional view of the apparatus shown in FIG. 4 taken through the line 5—5.

Referring now to FIG. 4 and FIG. 5, a baby seat mirror 10 is shown with a top mirror 44. FIG. 4 is a perspective view of the baby seat mirror 10 with the top mirror 44 attached to the reflective surface support means 16, while FIG. 5 is a cross-sectional view of the apparatus in FIG. 4 taken through the line 5—5. FIG. 5 illustrates the connection and support means of the top mirror 44 to the reflective surface support means 16. A top mirror base support 46 is affixed to the back of the reflective surface support means 16, which receives a top mirror base 54 (not shown here, see FIG. 6 through FIG. 9) with a mounting arm 48 extending from the top mirror base 54 to a rotatable top mirror joint 50. The rotatable top mirror joint 50 is fixedly attached to the top mirror 44, which houses a top reflective surface 52. The top mirror base support 46 is a U-shaped member with the opened-face oriented in the direction of either side of the reflective surface support means 16.

Figure 6:
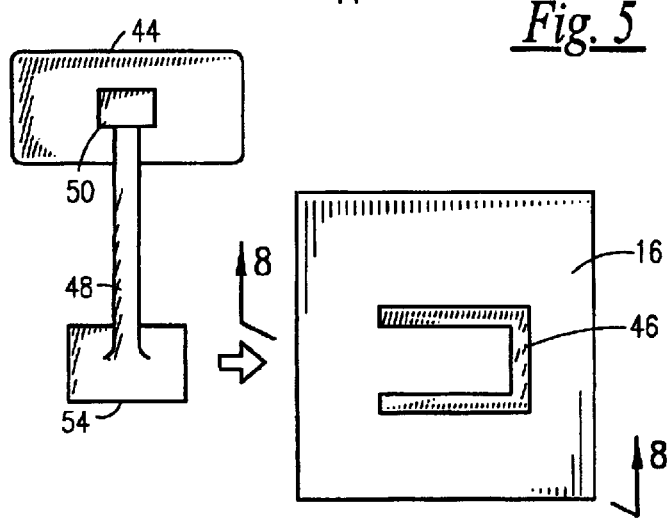
FIG. 6 is a rear view of the reflective surface support means shown having a top mirror supporting base member and with the top mirror detached from the base member.
Figure 7:
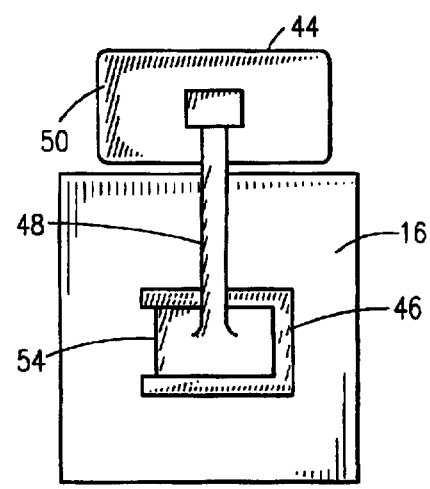
FIG. 7 is a rear view of the apparatus shown in FIG. 6 with the top mirror slidably attached to the base member.

Referring now to FIG. 6 through FIG. 9, a top mirror 44 is shown in various stages of assembly with the reflective surface support means 16 and the top mirror base support 46. FIG. 6 is a rear view of the reflective surface support means 16 that may house a top mirror base support 46 for securely receiving a top mirror base 54, which is shown unattached. FIG. 7 is a rear view with the top mirror base 54 slidably attached to the top mirror base support 46. FIG. 8 is cross-sectional view of the rear of the reflective surface support means 16 taken through line 8—8 with the top mirror base 54 shown unattached to the top mirror base support 46. As shown in FIG. 8, the top mirror base support 46 houses a pair of opposable slots 56 which receive the teeth 62 of the top mirror base 54. FIG. 9 shows the opposable slots 56 receiving the teeth 58 in a slidable fashion. The fit of the top mirror base 54 into the top mirror base support 46 is sufficiently tight to hold the top mirror base 54 in place. As shown in FIG. 10-A and FIG. 10-B, an optional locking device 60 may be included to completely lock the top mirror base 54 into the top mirror base support 46 by vertically sliding the locking device 60 into the lock cavity 62.

2. Operation of the Preferred Embodiment

To use the present invention, in accordance with the preferred embodiment of the present invention, as shown in FIG. 1 through FIG. 3, a baby seat mirror 10 is placed underneath a rear-facing child safety seat 34, with the impingement base 12 placed directly underneath the child safety seat 34 and the reflective surface support means 16 exposed and resting against the back support of the rear passenger seat 36, with said reflective surface 20 the securely seated child. The reflective surface 20 and reflective surface support means 16 can be adjusted by hand to best position the reflective surface 20 so as to reflect the child's image into the rear view vehicle mirror 40, if possible, along a line similar to that of line 42. The reflective surface support means is mainly intended for the entertainment of the child in that the child may not be visually accessible to the driver; As such, the top adjustable mirror is the primary mirror for viewing the child. Once the child safety seat 34 is securely fastened to the rear passenger seat 36 by a seatbelt (not shown), the weight of the child and child safety seat 34, and the added force of the seatbelt, will apply enough force to the impingement base 12 to hold the baby seat mirror 10 assembly securely in place. In an alternative embodiment, friction-generating strips 18 adhesively or fixedly attached to the impingement base 12 are included to supply additional resistance against shifting. The friction-generating strips 18 apply friction to the underside of the child safety seat 34, supplying the additional resistance mentioned.

In another alternative embodiment, a pivotal tightening knob 30 is included and is affixed at the hinging means 14. The pivotal tightening knob 30 is rotatable to either loosen or tighten the hold of the hinging means 14, thereby rigidly holding the reflective surface support means 16 in place, or alternatively allowing the user to loosen the rigidity for further adjustment.

In another alternative embodiment, an extendable impingement base 22 is included to provide a mechanism for the user to fold the impingement base 12 and the reflective surface support means 16 together and securely close the baby seat mirror 10 for convenient carry or storage. After folding the impingement base 12 and reflective surface support means 16 together, the user will secure the closure clip 26 around the closure prong 28, thereby flattening and securely closing the baby seat mirror 10.

As shown in FIG. 4 through FIG. 10-B, the adjustable top mirror 44 provides more viewable area and provide additional adjustable viewing. A user would grasp the top mirror 44 and place the top mirror base 54 into the top mirror base support 46, aligning the teeth 58 with the slots 56. Once aligned, the top mirror base 54 can be slid horizontally along and within the top mirror base support 46 until the top mirror base 54 is secured within the top mirror base support 46. A further alternative embodiment provides for a locking device 60 that slides vertically into a locking cavity 62 and secures the top mirror base 54 within the top mirror base support 46, and prevents the top mirror base 54 from accidentally sliding out of the mirror base support 46.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A foldable baby seat mirror comprising:

reflective surface support means;

an impingement base member forming an impingement base cavity and pivotally attached by hinging means to said reflective surface support means for pivoting said support means from a closed position to an opened position, said impingement base member being made of a durable substance that contains a plurality of friction-generating strips for inhibiting shifting of said baby seat mirror, said base member placed beneath a child safety seat;

a reflective surface attached to said reflective surface support means; and a top mirror removably attached to the reflective surface support means at a top mirror base support affixed to the back of said reflective surface support means.

2. The baby seat mirror of claim 2, further comprising a closure clip for securely attaching to a closure prong extending from a top of the reflective surface support means.

3. The baby seat mirror of claim 1, wherein a rotatable top mirror joint is fixedly attached to said top mirror.

4. The baby seat mirror of claim 1, wherein said top mirror is removably attached by slidable insertion of a top mirror base into a top mirror base support formed at the back of said reflective support means.

5. The baby seat mirror of claim 4, wherein said top mirror base has at least one tooth corresponding to at least one slot formed in said top mirror base support, said at least one tooth aligned with said at least one slot for slidable insertion therewith.

6. The baby seat mirror of claim 4, wherein said top mirror base is further impinged within said top mirror base support by a locking device vertically inserted through said top mirror base support and received by a lock cavity formed in said top mirror base support.

7. The baby seat mirror of claim 1, further comprising a knob for tightening and loosening said hinging means.

* * * * *